July 17, 1956  W. W. BURSACK  2,755,456
ICE DETECTOR
Filed Sept. 11, 1953  3 Sheets-Sheet 1

INVENTOR.
WILLIAM W. BURSACK
BY George H Fisher
ATTORNEY

INVENTOR.
WILLIAM W. BURSACK
BY
George H Fisher
ATTORNEY

July 17, 1956  W. W. BURSACK  2,755,456
ICE DETECTOR
Filed Sept. 11, 1953  3 Sheets-Sheet 3
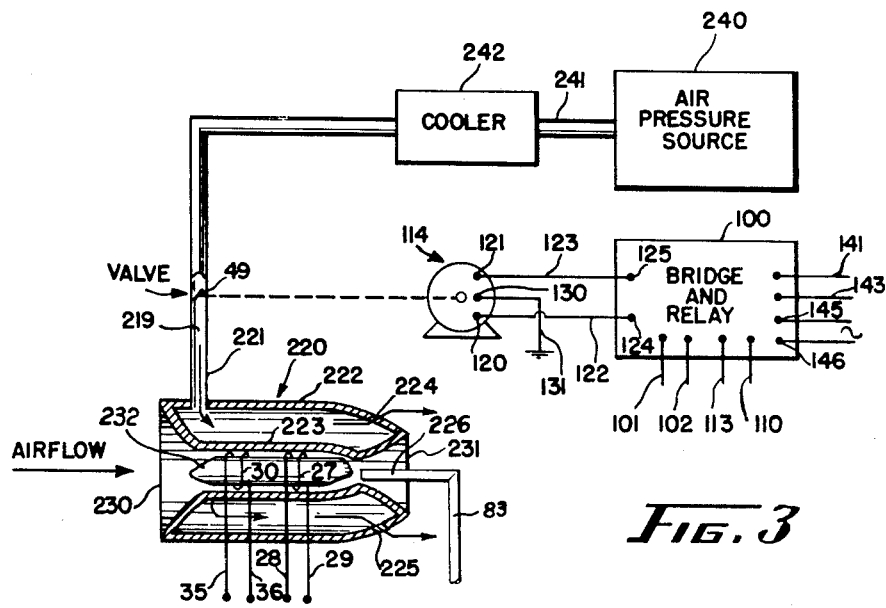
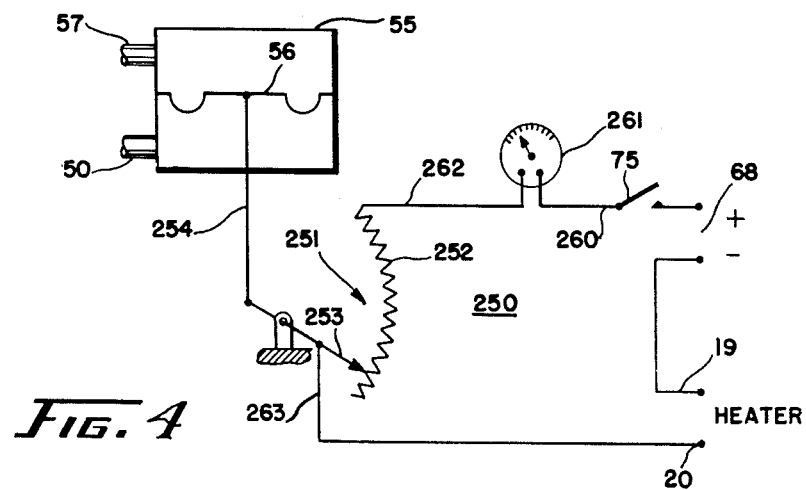
INVENTOR.
WILLIAM W. BURSACK
BY George H Fisher
ATTORNEY

United States Patent Office 2,755,456
Patented July 17, 1956

2,755,456
ICE DETECTOR

William W. Bursack, Richfield, Minn., assignor to Minneapolis-Honeywell Regulator Company, Minneapolis, Minn., a corporation of Delaware Application September 11, 1953, Serial No. 379,717

12 Claims. (Cl. 340—234)

The present invention is concerned with apparatus which is primarily intended for use on aircraft for anticipating the approachment of atmospheric conditions inducing the formation of ice. The invention is further concerned with apparatus for detecting the absolute formation of ice on the aircraft and to provide for the indication of the rate of the formation of ice.

In the modern aircraft having extremely high speeds and the power to rapidly change altitude the need of a device for anticipating the formation of ice has been greatly recognized. The formation of ice can take place very rapidly and before a pilot would be aware of the formation of ice a disastrous condition might arise. This is especially applicable to high speed jet aircraft where the formation of ice in the cowling or intake would reduce the air flow to the engine to cause the internal temperature of the engine to rise beyond a safe value.

This apparatus provides for the indication of the formation of ice on the aircraft and the existence of atmospheric conditions at which the formation of ice can be expected upon little change in the atmospheric conditions. The latter providing the pilot with a warning so that he will be aware that conditions can subsequently develop to cause the formation of ice.

More specifically the invention is concerned with the use of two geometrically similar pressure sensors that are placed in the air stream of the inlet duct or cowling of a jet engine. One of these sensors is cooled to a temperature below that of the other so that the cooled sensor will be the first to pick up ice when the aircraft enters an atmospheric condition in which the formation of ice is possible. A pressure differential will develop between the one sensor having the standard pressure and the cooled sensor, when it begins to ice over, to indicate to the pilot that the craft is being subjected to atmospheric conditions which on a slight change will cause a formation of ice on the aircraft. As the uncooled sensor would be susceptible to the same conditions as the aircraft, it and the aircraft will experience icing simultaneously and the reduction of the pressure of the uncooled sensor will indicate the present formation of ice on the aircraft. The invention further provides for a heater for preventing the formation of ice on the uncooled sensor, the amount of heat necessary being an indication of the rate of icing of the aircraft.

It is therefore an object of the present invention to provide an improved apparatus for anticipating an atmospheric icing condition for aircraft;

Another object of the present invention is to provide an improved apparatus for indicating the presence of an atmospheric icing condition for aircraft;

A further object of the present invention is to provide an improved apparatus for indicating the rate of icing resulting from a present atmospheric icing condition for aircraft;

A still further object of the present invention is to provide an improved apparatus for anticipating the approachment of an icing condition for aircraft and to indicate the presence of the condition;

A further object of the present invention is to provide a plurality of pressure sensors one of which is maintained at a temperature lower than the ambient temperature so that a change in the atmospheric condition for aircraft can be detected by the formation of ice on the one sensor.

A further object of the present invention is to provide a plurality of pressure sensors one of which is maintained at a temperature lower than the ambient temperature so that a change in the atmospheric conditions approaching an atmospheric condition causing the formation of ice on aircraft can be anticipated by the formation of ice on the one sensor and the absolute presence of such ice formation atmospheric condition can be detected by the formation of ice on the other sensor.

Other objects of the invention will be apparent from a consideration of the accompanying specification, claims and drawings of which:

Figure 3 is a second embodiment of my invention showing the cooled sensor which in combination with a similar sensor can be placed in the apparatus of Figure 1;

Figure 4 is a third embodiment of my invention for indicating the rate of formation of ice when used in combination with the apparatus shown in Figure 1.

Figure 1:
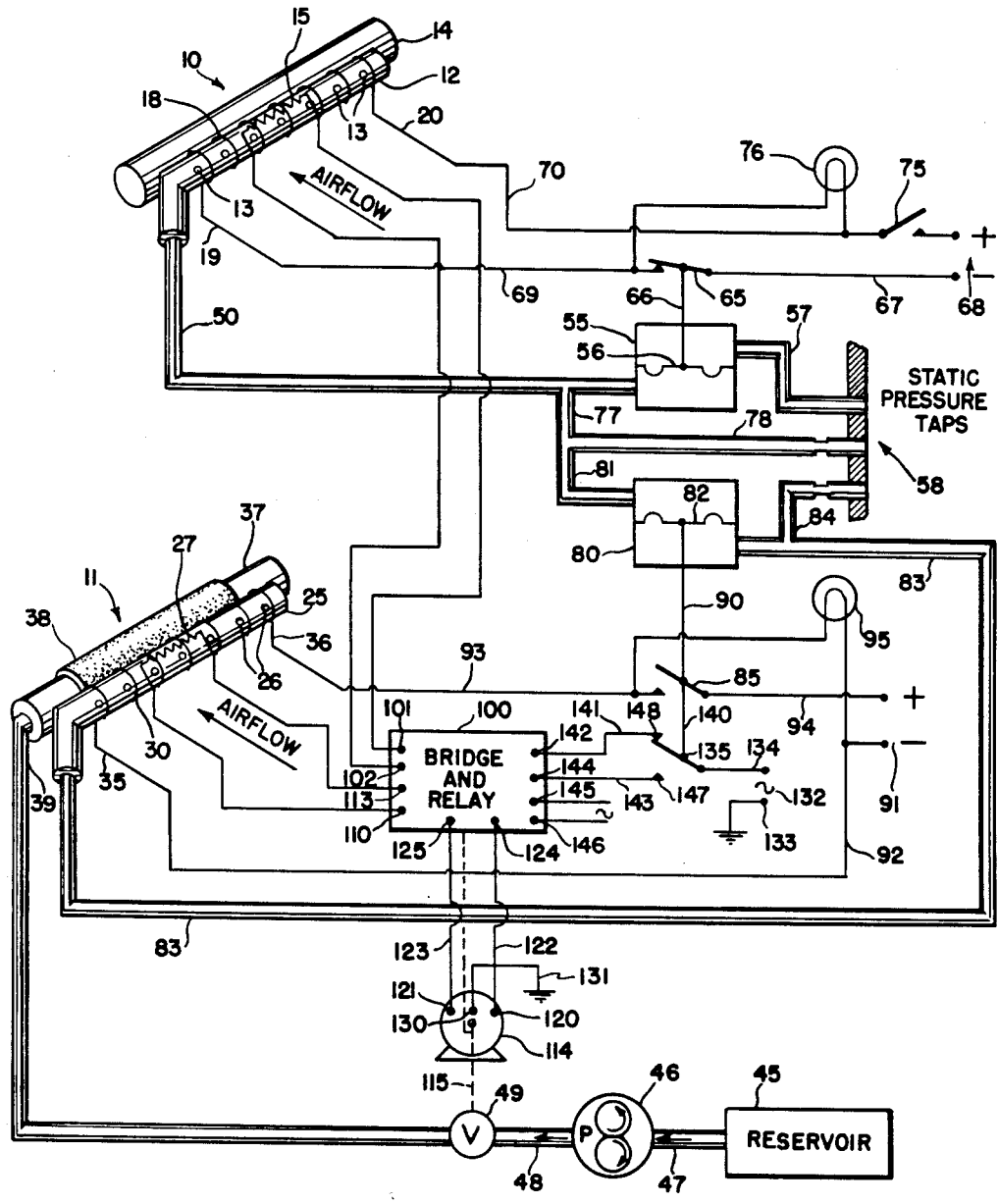
Figure 1 is a schematic circuit of one embodiment of my invention.

Referring to Figure 1, two geometrically similar pressure sensors 10 and 11 while shown schematically are intended to be positioned on the exterior of an aircraft in the air flow. More particularly, they are to be placed in the cowling or inlet of a jet engine aircraft. Wherever located the sensors should be subject to the same conditions of impact air temperature, air flow, water impingement, and altitude. The sensor 10 comprises a hollow cylindrical shaped member 12 mounted adjacent a second cylindrical member 14 which has no function except that of making the two sensors 10 and 11 geometrically similar. Member 12 has a plurality of aligned laterally spaced holes 13 for receiving the impact air. Mounted on member 12 in a heat transferring relation is a temperature responsive resistance element 15. A heating resistance element 18 is also wrapped around member 12 in a heat transferring relation so that upon the energization of the element at extremities 19 and 20 heat will be supplied to sensor 10. Sensor 11 comprises a hollow cylindrical member 25 with a plurality of holes 26 for receiving air flow, a temperature responsive resistance element 27, and a heater resistance element 30 having extremities 35 and 36. Mounted adjacent cylindrical member 25 is a second hollow cylindrical member 37 which is surrounded by a porous sintered material 38 which provides a wick for a volatile liquid supplied to the member 37 through a conduit 39. The liquid is fed from a reservoir 45 by a flow path as follows: an output conduit 47 of the reservoir, a constant displacement pump 46 or any suitable means for maintaining a pressure on the liquid supplied to the wick, a conduit 48, and a valve 49. The wick provides for evaporative cooling of sensor 11 as the air passes over the wick and the volatile liquid evaporates. Thus the cooling efficiency of the wick 38 would be greater with a highly volatile fluid such as alcohol; however, it is possible that some fuels used in aircraft engines would meet the requirements and provide sufficient cooling for the sensor.

The cylindrical member 12 of the sensor 10 is connected by a conduit 50 to a pressure differential 55. The actuator has a diaphragm 56 which is exposed to total pressure on the other side through the conduit 57 which is connected to the static pressure taps 58. The use of exterior static pressure taps in aircraft is common as the pressure inside an aircraft may change as a result of conditions other than altitude.

The actuator 55 is connected in controlling relation to a single pole single throw switch 65 through a mechanical link 66 connected to the diaphragm 56. The heater 18 of the sensor 10 is connected to a source of power 68 through the circuit as follows: from the conductor 67 connected to one side of the source, switch 65, conductor 69, extremity 19, resistance element 15, extremity 20, a conductor 70, a main switch 75 and the other side of the power source. An indicator light 76 is connected between conductor 70 and conductor 69. When the main switch 75 is in a closed position and the pressures on both sides of the diaphragm 56 are equal heater 18 and warning light 76 will be energized. Upon an increase of the total pressure resulting from air flow impinging the sensor 10 the switch 65 will open to shut off light 76 and de-energize heater 18. Conduit 50 is connected to static pressure taps 58 through a conduit 77 and a restricted conduit 78 to bleed off air and reduce any pressure existing when holes 13 are sealed by either the formation of ice or other means.

A second pressure differential actuator 80 is connected by a conduit 81 to conduit 77 so that the total pressure of the sensor 10 is applied to one side of a diaphragm 82. The total pressure developed in sensor 11 is applied by conduit 83 to the other side of diaphragm 82. Conduit 83 is connected through a restricted conduit 84 to static pressure taps 58 for the same purpose as conduit 50, as explained above.

The pressure actuator 80 is connected in an operative relation to a single pole single throw switch 85 by a mechanical link 90 connected to diaphragm 82. Heater 30 of sensor 11 is connected to a source of power 91 similar to power source 68 through a circuit as follows: conductor 92 connected to one side of voltage source 91, extremity 35, resistance element 30, extremity 36, a conductor 93, switch 85, a conductor 94, and the other side of voltage source 91. An indicator light 95 is connected to conductors 92 and 93. When total pressures of sensors 10 and 11 are applied to the opposite sides of diaphragm 82 switch 85 will be open and upon the restriction of holes 26 of sensor 11 due to the formation of ice the total pressure will be reduced on one side of diaphragm 82 to close switch 85 and energize heater element 30 and indicator light 95. As the capacity of heater 30 is sufficient to melt off any ice forming on sensor 11, the total pressure will again increase in conduit 83 to operate actuator 80 and deenergize the heater and indicator light. Upon the continuance of atmospheric conditions that would cause icing on sensor 11 the sequence would be continued and the indicator light would flash off and on to give the pilot of the aircraft a visual warning that the aircraft was entering atmospheric conditions in which the formation of ice on the aircraft can develop with little change in the atmospheric condition.

Figure 2:
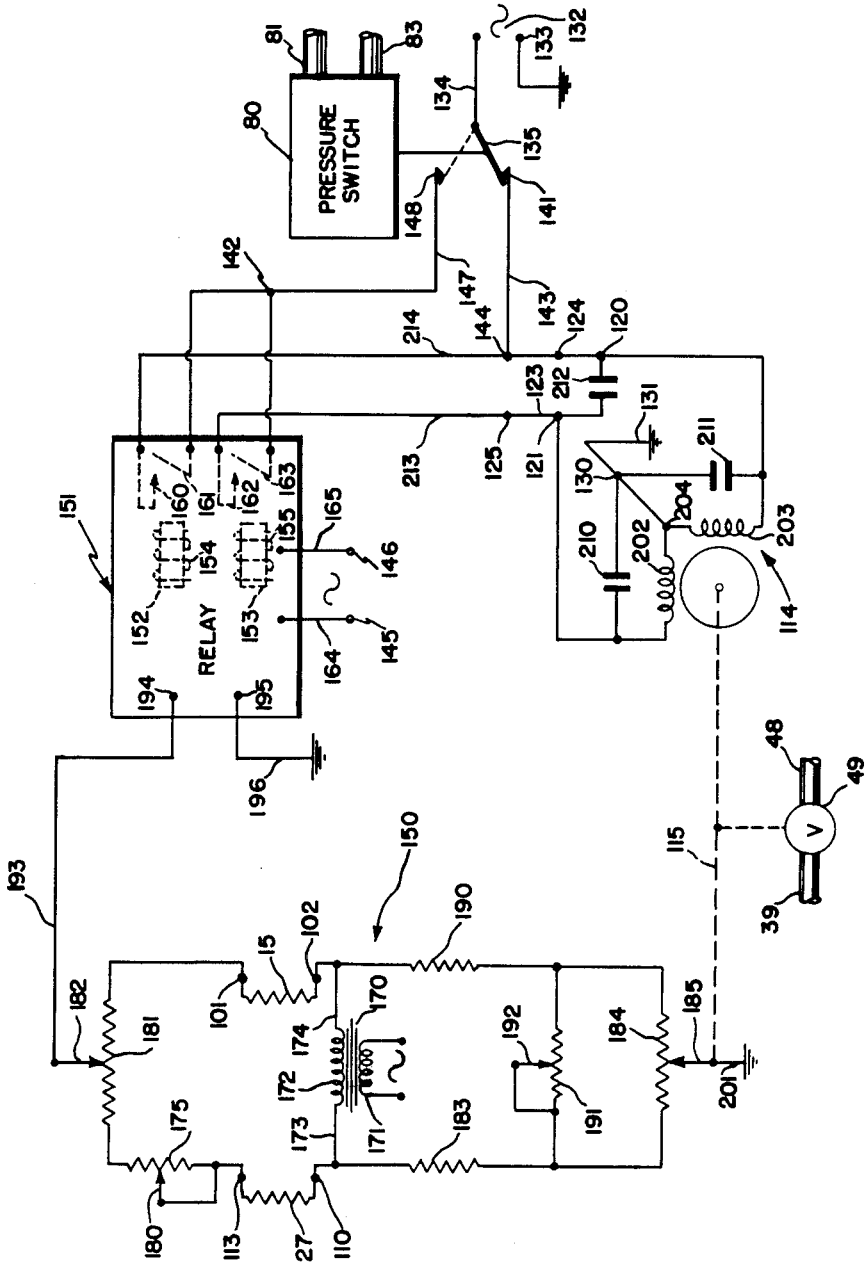
Figure 2 is a schematic circuit of the temperature differential controlling apparatus for maintaining a selected temperature differential between the two sensors.

The cooling supply to sensor 11 is controlled to maintain a predetermined temperature differential between sensors 10 and 11. A bridge and relay 100 which is shown in Figure 2 and will be hereafter explained has temperature responsive resistor element 15 connected to the bridge terminals 101 and 102 and resistor element 27 connected to terminals 110 and 112. A motor 114 is connected in a controlling relation to valve 49 by a mechanical connection 115 which can be a gear train drive of a sort commonly known to one skilled in the art. Two input terminals 120 and 121 of the motor are connected by the conductors 122 and 123, respectively, to the output terminals 124 and 125 of bridge and relay 100. A terminal 130 of the motor is connected to ground by a conductor 131. Bridge and relay 100 is connected to a source of power 132 having a terminal 133 grounded and the other terminal 134 connected to a single pole double throw switch 135. The switch is connected to link 90 by a link 140 so that when the pressure on each side of the diaphragm 82 is equal switch 135 will connect conductor 134 to a conductor 141 which is connected to a terminal 142 of bridge and relay 100. Terminals 145 and 146 are provided for connecting bridge and relay 100 to a source of power. When switch 135 is in a position to supply power from source 132 to conductor 141 control of motor 114 and valve 49 for the coolant supply depends upon the unbalance of the bridge containing the temperature responsive resistors 15 and 27, as will be hereafter explained. When switch 135 is in a position to connect the source to terminal 144 of bridge and relay 100, motor 114 is operated to close valve 49. Thus switch 135 provides automatic control of the temperature differential between sensors 10 and 11 when sensor 11 is free from ice and upon the formation of ice on sensor 11 the actuator 80 will shut off the coolant supply.

While the temperature differential between the sensors is shown to be controlled by bridge and relay 100, sensor 11 can be designed for some applications so that upon supplying volatile fluid to the wick at a predetermined rate the temperature differential will remain within certain limits for proper operation of the apparatus without temperature control apparatus.

Referring to Figure 2, a bridge circuit 150 is connected to control motor 114 through a relay 151 of a type similar to the disclosure in the A. P. Upton Patent 2,423,534, issued July 8, 1947. Relay 151 has a pair of magnetic actuated relays 152 and 153, each having a winding 154 and 155, respectively. Upon energization of one or the other of the windings, switches comprising a contact 160 and an armature 161, and a contact 162 and an armature 163, respectively, will be closed. Relay 151 is connected to the source of power by the conductors 164 and 165.

Bridge circuit 150 is a conventional Wheatstone bridge having a transformer 170 with a primary winding 171 connected to a source of power and a secondary winding 172 having two extremities 173 and 174. One branch of the bridge circuit is as follows: extremity 173, element 27 of cooled sensor 11, a resistor 175 having an adjustable wiper 180 for shorting out a portion of the resistor to establish the temperature differential of the bridge network, a calibration resistor 181 having an adjustable output terminal 182, element 15 of sensor 10, and extremity 174. The second branch is as follows: extremity 173, a resistor 183, a balance potentiometer comprising a resistor 184 having an adjustable wiper 185, a resistor 190, and extremity 174. Connected in parallel with balance resistor 184 is a sensitivity resistor 191 with a movable wiper 192 for shorting out a portion of the resistor. The output of bridge network 150 is connected to relay 151 by a conductor 193 connecting wiper 182 and an input terminal 194 of the relay. A second input terminal 195 is connected to a ground connection by conductor 196. Wiper 185 of the bridge is connected to a ground connection 201 and also is mechanically connected to the output of motor 114. Thus the motor can control the rate of flow of the coolant fluid and also balance bridge 150.

Motor 114 is of a conventional sort having two windings 202 and 203 connected at one end thereof to a common terminal 204 which is connected to ground, and to input terminals 120 and 121. Connected in parallel with windings 202 and 203 are capacitors 210 and 211, respectively, which are primarily used as a radio noise shield by preventing excessive sparking of the control relay. A capacitor 212 is connected across the input terminals of motor 114 to provide for a phase displacement in the voltage that is applied to one or the other of the windings depending upon which side of the condenser the main power source is connected. Output terminals 125 and 124 connected to motor 114 are connected to relay contacts 160 and 162 by the conductorrs 213 and 214, respectively. Armatures 161 and 163 are connected by a conductor 147 to the second contact 148 of switch 135. As previously explained, pressure actuator 80 determines to which of contacts 141 or 148 power connection 134 will be connected. When the pressure in the conduit 83 has been reduced there is no need for coolant and switch 135 connects contact 141 to supply power to motor 114 through winding 203 to ground and through condenser 212 and winding 202 to ground. Capacitor 212 provides for a phase displacement of the voltage that is applied to the winding 202 with respect to the voltage of winding 203 resulting in the operation of the motor in a direction to close valve 49 and shut down the coolant supply.

When the pressures in conduits 81 and 83 are equal and switch armature 135 is contacting contact 148, power will be supplied through conductor 147 to relay 151. The control of motor 114 is thus dependent upon the operation of one or the other of relays 152 and 153. Upon the energization of relay 152 power will be supplied to conductor 214 and the motor will run in a direction to close the valve 49. The opposite operation will take place when relay 153 is energized.

As is obvious to one skilled in the art the temperature differential which is required between temperatures of sensors 10 and 11 can be controlled by the adjustment of wiper 180 on resistor 175 and wiper 182 on resistor 181.

As the apparatus is shown voltage would be available to sources 68, 91 and 132 from the aircraft power system. When switch 75 was closed, while the aircraft was still on the ground indicator light 76 would be energized as switch 65 would be closed, there being an equal pressure on both sides of diaphragm 56. The energization of indicator light 76 would remain until the aircraft was placed in motion and airflow directed to sensor 10 to increase the pressure in conduit 50. After the aircraft was in flight should indicator light 76 remain energized, the pilot would know that holes 13 of pressure sensor 10 were plugged or some other fault existed in his system. Also upon an energization of indicator light 95 after pressure has developed in conduit 50 from pressure sensor 10 the pilot could anticipate that holes 26 of pressure sensor 11 were plugged to prevent the build up of the pressure on the opposite side of pressure actuator 80. Normally with proper operating pressure sensors 10 and 11 both indicator lights 76 and 95 would be deenergized and switch 135 would supply voltage to relay 100 so that the amount of coolant supplied to sensor 11 would maintain a predetermined temperature differential between sensors 10 and 11.

Assume that we approach an atmospheric condition causing icing on cooled sensor 11. The holes 26 would be restricted and the pressure on the lower side of pressure actuator 80 would be reduced to actuate switch 135 and close off valve 49 to reduce the coolant supply. At the same time indicator light 95 and heater 30 would be energized so that the pilot would receive a visible indication that the cooled sensor was icing and the heat from heater 30 would begin to de-ice the sensor. As soon as the sensor was de-iced the pressure would be restored to the lower portion of actuator 80 and the sequence would start again providing the atmospheric conditions were such that icing of sensor 11 continued. The pilot would be given a visible indication of icing on the cooled sensor by the flashing of the indicator light. Assume that the characteristics of the atmosphere changed so that ice began to form on the aircraft and sensor 10. Upon the reduction of the pressure in conduit 50 resulting from the plugging of holes 13 switch 65 would close to energize indicator light 76 and also the heater 18. The heater would then remove the ice on sensor 10 to start the sequence of operation again. Indicator light 76 would flash off and on when icing was taking place on sensor 10. From this description it is apparent that the apparatus provides for a visible indication when the atmospheric conditions are such that upon a slight change of such conditions icing on the aircraft could exist and a visible indication of the existence of such icing conditions.

Referring to Figure 3, a second embodiment of the invention is shown, in particular a pressure sensor 220 which can be used in place of sensor 11 shown in Figure 1. If this sensor were to be used a second geometrically similar sensor would be used to replace sensor 10. Sensor 220 comprises a double wall cylinder to which a coolant medium 219 can be directed from a conduit 221 into the cavity between the walls 222 and 223 and escape by means of holes 224 and 225 on the downstream end of the cylinder. The cylinder is positioned in a location similar to pressure sensors 10 and 11 previously explained so that the air flow is directed through an opening at the front end 230 of the cylinder and exits at the rear end 231 of the cylinder. A pressure probe 226 connected to conduit 83 is responsive to the pressure at the rear of the cylinder. A bobbin 232 is placed in the internal cavity of the sensor 220 so that the air received will pass around the bobbin and between the inner surface of wall 223 and the bobbin. Wrapped around bobbin 232 are heater element 30 and resistance element 27 with extremities 35 and 36, and 28 and 29, respectively.

As previously mentioned cooling medium 219 is supplied to sensor 220. This cooling medium could be air from an air pressure source 240 directed by a conduit 241 to a cooler 242 which is connected to conduit 221. When this apparatus is used on a jet aircraft, air pressure source 240 could be the jet engine compressor. Cooler 242 provides for reducing the temperature of the air before it is delivered to sensor 220. It comprises a heat exchanger in which air flow is directed past fins and a Vortex tube or a small air turbine for removing heat energy from the air. Valve 49 controls the amount of coolant medium 219, air in this particular case, that is received by sensor 220. Motor 114 and bridge and relay 100 which were described in detail in connection with Figure 1 control the position of valve 49. With the apparatus of Figure 3 the invention would operate in a similar manner as previously explained.

Referring to Figure 4 an embodiment of the invention is shown for indicating the rate of icing of pressure sensor 10. The apparatus of Figure 1 would be modified by placing network 250 under the control of pressure actuator 55 so that the power to heater 18 could be varied proportionately to the pressure differential existing across diaphragm 56. A potentiometer 251 having a resistor 252 and a movable wiper 253 is controlled through a mechanical linkage 254 connected to diaphragm 56. Potentiometer 251 is connected in a circuit as follows: from the source of power 68, main switch 75, a conductor 260, a meter 261 for indicating the amount of current flowing through the heater, a conductor 262 one end of resistor 252, wiper 253, a conductor 263, extremity 20, the heater, and extremity 19 which is connected to the negative terminal of the source of power 68.

When the invention as shown in Figure 1 is modified by the apparatus of Figure 4 an indication of the rate of icing of the aircraft is provided. As the pressure was reduced in conduit 50 upon the restriction of holes 13 of pressure sensor 10 the amount of resistance would be reduced by the movement of wiper 253 upward on resistance 252. The amount of heat needed to keep sensor 10 free of ice would be proportional to the rate at which the ice was forming on the sensor. This would be indicated by meter 261.

It is obvious to one skilled in the art that the invention as shown provides for a visible indication to the pilot of an aircraft that icing of his craft will take place upon a slight change in the atmospheric conditions, that icing is actually taking place on his aircraft and that the rate of icing is indicated. To connect the de-icing equipment of an aircraft under the direct control of the invention as shown would be obvious to one skilled in the art. These and other modifications are defined in the appended claims.

I claim as my invention:

1. In apparatus for anticipating an icing condition for aircraft, first and second pressure sensor means each being placed in the air stream of the craft and each developing a pressure therein when the craft is in flight, said pressure being reduced when said sensors are iced up, heating means thermally associated with said second sensor means for removing any ice forming thereon, first and second temperature responsive means, means thermally connecting said responsive means to said first and second sensors, respectively and being responsive to the temperature of said sensor means, respectively, cooling means thermally contacting and thereby cooling said second pressure sensor, control means, connection means connecting said control means to control said cooling means, said control means including said first and second temperature responsive means so that the temperature of said second sensor is maintained a predetermined amount below the temperature of said first uncooled sensor thus upon the aircraft experiencing certain atmospheric conditions said cooler second sensor will ice up and yet the atmospheric conditions may not be such to cause icing of the aircraft, pressure responsive means being responsive to the difference in two pressures, connection means connecting said first and second sensors to said pressure responsive means so that said responsive means responds to the difference of the pressures developed in said sensors, switch means, indicator means, circuit connection means including said switch means for connecting said indicator means and said heating means to a source of power so that upon said switch means being closed said indicator means and said heating means are energized, and connection means connecting said pressure responsive means to said switch means so that upon a decrease in the pressure in said second sensor with respect to the pressure in said first sensor due to said second sensor icing up said switch is closed to energize said indicator means.

2. In apparatus for indicating icing conditions of an aircraft, a plurality of pressure sensing probes extending to the exterior of the aircraft for sensing total air pressure, one of said probes having heating means and temperature responsive means associated therewith in thermal contacting relation, another of said probes having heating means, temperature responsive means and cooling means associated therewith in thermal contacting relation; control means, connection means connecting said temperature responsive means of each of said probes to said control means, further connection means connecting said control means to said cooling means to maintain a predetermined temperature differential between said probes thereby said another probe will tend to ice up upon the presence of atmospheric conditions in which the aircraft does not normally ice up; a static pressure source; first pressure responsive control means responsive to the difference between two pressures, means connecting the static pressure of said source and the total pressure of said one probe to said first pressure control means; switch means, means connecting said pressure responsive control means to said switch means, a source of power, means including said switch means for connecting said heating means of said one probe of said source of power so that said heating means is energized when said total pressure of said one probe drops below a predetermined value, second pressure responsive control means responsive to the difference between two pressures, means connecting the total pressure of said one and said another probes of said second pressure responsive control means, said control means being connected so that said difference exists when said one probe is clear of ice and said another probe is iced up, and further switch means, means connecting said second control means to said switch means, and means including said further switch means for connecting said heating means of said another probe to said source of power.

3. In apparatus for the indication of an icing condition for aircraft, a plurality of geometrically similar pressure sensor means, said sensor means being mounted on the exterior of the aircraft in a free air stream for receiving ram air, each of said sensors having outputs indicative of total pressure therein, one of said sensor means having heating means integral therewith for supplying heat thereto and the other of said sensor means having heating means and cooling means integral therewith for supplying heat thereto or removing heat therefrom, respectively; control means, means connecting said control means to control said cooling means to maintain a predetermined temperature differential between said one and said other sensor means; first responsive means, means connecting said responsive means to said one sensor means to be responsive to a change in the output of said one sensor means upon said sensor means icing up when the aircraft is in an atmosphere causing icing thereon; a source of power; means including said first responsive means for connecting said heating means of said one sensor means to said source of power whenever icing occurs thereby melting the ice on the sensor thereby operation of said first responsive means provides an indication that the aircraft is icing; second responsive means, means connecting said second responsive means to said one and said other sensor means to be responsive to a change in the difference in the outputs of said one and said another sensor means upon said other sensor means icing up when the aircraft is in such atmospheric conditions, the proper operation of said second responsive means depending upon said one sensor means being clear of ice, means including said second responsive means for connecting said heating means of said other sensor means to said source of power whenever icing occurs on said other sensor so that said heating means is effective to melt the ice thereby periodically operating said second responsive means giving an indication that the aircraft is in an atmosphere in which icing is likely to occur upon a slight change in the atmospheric conditions.

4. In apparatus for anticipating an icing condition for aircraft and for indicating the formation of ice on the aircraft; first and second sensor means having an output indicative of the presence of ice thereon; first and second heating means; means connecting said first and second heating means to said first and second sensor means; cooling means; means connecting said cooling means in thermal relation to said second sensor means; temperature control means connecting said control means to said cooling means to maintain a predetermined temperature differential between said sensors; first control means; means connecting said first control means to said first sensor means to respond to its output; means connecting said first control means to said first heater means for selectively energizing said heater depending upon the amount of ice forming on said first sensor means; indication means, means connecting said indication means to said first control means; second control means, means connecting said second control means to said first and second sensor means; said second control means being actuated in a first direction when said first sensor means is free of ice and said second sensor means ices up, means connecting said second control means to said second heater means; indication means; means connecting said last mentioned indication means to said second control means when actuated in said first direction for indicating the formation of ice on said cooler sensor means.

5. In apparatus for anticipating an icing condition for aircraft, first condition responsive means, second condition responsive means, said first and second means being placed in the air stream of the craft thereby each having an output indicative of the total air pressure, cooling means located in heat transferring relation to said second responsive means cooling said second condition responsive means, control means, means connecting said control means to said cooling means thereby controlling said cooling means to maintain a predetermined temperature differential between said first and second responsive means, condition indicating means being responsive to two input signals, and means connecting the outputs of said first and second condition responsive means to said indicating means, said indicating means upon the output of said second condition responsive means deviating from that of said first responsive means indicating the presence of atmospheric conditions close to those in which icing of the aircraft will occur.

6. In apparatus for anticipating an icing condition for aircraft, first and second pressure sensor means each having a pressure output when free of ice; cooling means; means connecting said cooling means to said second sensor means to maintain a predetermined temperature differential between said first and second sensor means, pressure responsive control means, and means connecting said pressure responsive control means to said two sensor mean to respond to the output pressures, said control means being responsive to the pressure differential between said first and second sensor means when icing on the cooler of said sensor means occurs thereby anticipating the nearing of icing conditions.

7. In apparatus for anticipating an icing condition for aircraft, first and second pressure sensor means, cooling means, means connecting said cooling means to said second sensor means to maintain a predetermined temperature differential between said first and second sensor means, said sensor means having a pressure output when no ice has formed thereon, pressure responsive control means, and connection means connecting said outputs of said first and second sensor means to said control means, said control means being responsive to the pressure differential between the outputs of said first and second sensor means whenever the cooler of said sensor means ices over.

8. In apparatus for anticipating the approachment of atmospheric conditions causing the formation of ice, first and second pressure sensing means, said sensing means being placed in the air stream of the craft and each having an output pressure when no ice forms thereon, cooling means, means connecting said cooling means to said second sensing means thereby maintaining a predetermined temperature differential between said first and second pressure sensing means, first pressure responsive control means, means connecting said first control means to said first and second sensing means to be responsive to the difference between the output pressures of said first and second sensing means thereby sensing the presence of ice on the cooler of said sensing means.

9. In control apparatus, first condition responsive means, second condition responsive means, cooling means thermally associated with one of said responsive means maintaining a predetermined temperature differential between said aforementioned means, first control means, said second responsive means being responsive to a condition indicative of a need of operation of said first control means, and further connection means connecting said first and second condition responsive means in controlling relation to said first control means so that a condition effecting the cooler of said responsive means is effective upon said first control means.

10. In apparatus for anticipating a change in conditions, first condition responsive means, second condition responsive means, cooling means, means thermally connecting said cooling means to said second responsive means, temperature responsive means responsive to the temperature difference between said first and second responsive means, means connecting said temperature responsive means to control said cooling means thereby maintaining a predetermined temperature differential between said first condition responsive means and said second condition responsive means, first control means, and connection means for connecting said first and second condition responsive means in controlling relation to said first control means so that a change in the conditions effecting said second condition responsive means will selectively energize said first control means.

11. In apparatus for sensing conditions affecting the icing of an aircraft, first pressure responsive means located in the air stream of the craft, second pressure responsive means located in the air stream of the craft, the outputs of said first and second means varying as icing occurs thereon, first heating means associated with said first responsive means, second heating means associated with said second responsive means, cooling means connected in thermal relation to said second responsive means, control means, means connecting said control means to said cooling means for maintaining a temperature difference between said first and second responsive means, means connecting said first responsive means so that its output controls said first heating means thereby heating said responsive means when ice forms thereon, further means connecting said first and second responsive means to said second heating means so that the difference in the outputs thereof controls said second heating means, said difference occurring when said first responsive means is free of ice and said second responsive means ices up, indicating means, and means including said further means for energizing said indicating means whenever ice forms on said second sensor.

12. In apparatus for sensing conditions affecting the icing of an aircraft of claim 11 having cooling means comprising, a source of cooled air under pressure, variable flow control means, conduit means for directing the air in heat absorbing relation to said second responsive means, and further conduit means connecting said source, said control means and said conduit means in a series relation.

References Cited in the file of this patent

UNITED STATES PATENTS

| 2,229,740 | Helmore | Jan. 28, 1941 |
| 2,541,512 | Hahn | Feb. 13, 1951 |
| 2,656,525 | Kinsella | Oct. 20, 1953 |

FOREIGN PATENTS

| 626,543 | Great Britain | July 18, 1949 |
| 860,974 | France | Oct. 15, 1940 |